(12) United States Patent
Yasuhara et al.

(10) Patent No.: US 8,668,252 B2
(45) Date of Patent: Mar. 11, 2014

(54) VEHICLE BODY FLOOR STRUCTURE

(75) Inventors: Shigeto Yasuhara, Shioya-gun (JP); Kimitaka Ando, Shioya-gun (JP); Yuji Matsuura, Haga-gun (JP); Katsunari Sugawara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/513,969

(22) PCT Filed: Dec. 13, 2010

(86) PCT No.: PCT/JP2010/072354
§ 371 (c)(1),
(2), (4) Date: Jun. 5, 2012

(87) PCT Pub. No.: WO2011/074527
PCT Pub. Date: Jun. 23, 2011

(65) Prior Publication Data
US 2012/0256446 A1    Oct. 11, 2012

(30) Foreign Application Priority Data
Dec. 16, 2009    (JP) .................................. 2009-285134

(51) Int. Cl.
*B62D 25/20*    (2006.01)

(52) U.S. Cl.
USPC .. 296/193.07; 296/209; 296/204; 296/187.08

(58) Field of Classification Search
USPC ............ 296/187.08, 187.09, 193.07, 193.09, 296/204, 203.02, 203.03, 209

IPC ........................................................ B62D 25/20
See application file for complete search history.

(56) References Cited

U.S. PATENT DOCUMENTS 5,806,918 A * 9/1998 Kanazawa .................... 296/204
(Continued)

FOREIGN PATENT DOCUMENTS

| JP | 63-063272 | 4/1988 |
|---|---|---|
| JP | 4-002581 | 1/1992 |
| JP | 9-066864 | 3/1997 |
| JP | 2004-237920 | 8/2004 |
| JP | 2005-119489 | 5/2005 |
| JP | 2005-119490 | 5/2005 |
| JP | 2006-103591 | 4/2006 |
| JP | 2009-018725 | 1/2009 |

OTHER PUBLICATIONS

European Search Report, Application No. 10837553.6, dated Jun. 25, 2013, 3 pages.

*Primary Examiner* — Glenn Dayoan
*Assistant Examiner* — Pinel Romain
(74) *Attorney, Agent, or Firm* — Rankin, Hill & Clark LLP

(57) ABSTRACT

In this vehicle body floor structure, stiffeners that extend to a rear of a front cross member and that have a U-shaped concave portion that is open at to top thereof when viewed in a cross-section of a vehicle are joined to a bottom surface on both side portions of floor panel. Beads that have a U-shaped concave portion when viewed in a cross-section of the vehicle are provided at a rear portion of the floor panel, and the beads are aligned with the concave portion of the stiffeners and are provided continuously with the stiffeners.

3 Claims, 8 Drawing Sheets

(56) References Cited

U.S. PATENT DOCUMENTS

| | | | |
|---|---|---|---|
| 6,039,386 A * | 3/2000 | Hasshi et al. | 296/203.01 |
| 6,811,211 B2 * | 11/2004 | Saito | 296/203.02 |
| 7,178,861 B2 * | 2/2007 | Yamada et al. | 296/204 |
| 7,204,547 B2 * | 4/2007 | Okana et al. | 296/204 |
| 7,270,366 B2 * | 9/2007 | Kamura et al. | 296/193.07 |
| 7,306,281 B2 * | 12/2007 | Kobayashi et al. | 296/204 |
| 2005/0082879 A1 | 4/2005 | Goto et al. | |
| 2006/0066138 A1 | 3/2006 | Okana et al. | |
| 2010/0244496 A1 * | 9/2010 | Bellanger et al. | 296/204 |
| 2011/0272972 A1 * | 11/2011 | Takayanagi | 296/204 |

* cited by examiner

VEHICLE BODY FLOOR STRUCTURE

TECHNICAL FIELD

This invention relates to a vehicle body floor structure.

Priority is claimed on Japanese Patent Application No. 2009-285134, filed Dec. 16, 2009, the contents of which are incorporated herein by reference.

BACKGROUND ART

A vehicle body structure is known that is provided with: front side frames that are placed along the vehicle fore-and-aft direction on both side portions of the engine room; side sills that are placed along the vehicle fore-and-aft direction on both side portions of the vehicle cabin; and center frames that are placed along the vehicle fore-and-aft direction in a center portion in the vehicle lateral direction of the vehicle cabin. In this vehicle body structure, connecting components are provided that connect together rear end portions of the front side frames, front end portions of the side sills, and a front end portion of the center frames.

The connecting components are provided with an outrigger that extends diagonally rearwards as it moves outwards in the vehicle lateral direction and that is connected to the front end portions of the side sills, and with a center frame extension that extends diagonally rearwards as it moves inwards in the vehicle lateral direction and that is connected to the front end portion of the center frames. As a result, when the vehicle is in a collision, the collision load in a rearward direction that is input into the front side frames is dispersed in a vehicle lateral direction via the connecting components to the side sills and the center frames, and any deformation of the vehicle cabin that is caused by this collision load can be kept to a minimum (refer to Patent Document 1).

PRIOR ART DOCUMENTS

Patent Document

[Patent document 1] Japanese Unexamined Patent Application, First Publication No. 2009-18725

DISCLOSURE OF THE INVENTION

Problems to be Solved by the Invention

However, in the above-described conventional structure, beneath the front side frame, suspension components are provided, and these support a structural sub-frame on which the engine is mounted. If this structure is employed, because the input load when the vehicle is in a frontal collision is transferred directly from the sub-frame to the center frame extension, it is necessary to increase the strength of the center frame extension. However, if the strength of the center frame extension is increased, the weight of the center frame extension is also increased, which is a drawback that runs counter to the aim of lightening the vehicle body. Furthermore, because it becomes necessary to increase the cross-sectional area of the center frame extension, the floor surface is raised, and the problem arises that the vehicle cabin interior is made smaller.

For these reasons, it is an aim of this invention to provide a vehicle body floor structure that disperses an input load, which is applied to the front portion of the vehicle body, in the lateral direction of the vehicle body, and that, by dispersing and supporting the input load in the vehicle fore-and-aft direction as well, also makes it possible to lighten the vehicle body and enlarge the vehicle cabin interior, and that also achieves an improvement in rigidity.

Means for Solving the Problem

The present invention employs the following structures in order to solve the above described problems and achieve the stated aims.

Namely, (1) A vehicle body floor structure according to an aspect of the present invention includes: front side frames that are placed along a fore-and-aft direction of a vehicle on both side portions of an engine room; side sills that are placed along the fore-and-aft direction on both side portions of a vehicle cabin; center frames that are placed along the fore-and-aft direction in a center portion in a vehicle lateral direction of the vehicle cabin; and connecting components that connect together rear end portions of the front side frames, front end portions of the side sills, and a front end portion of the center frames, wherein the connecting components are provided with outriggers that extend diagonally rearwards toward outside of the vehicle lateral direction and that is connected to the front end portions of the side sills, and with center frame extensions that extend diagonally rearwards toward inside of the vehicle lateral direction and that is connected to the front end portion of the center frames, and a floor panel are provided extending over the side sills and the center frames, and a front cross member that extends in the lateral direction is provided on a top surface of the floor panel, and stiffeners that extend to a rear of the front cross member and that have a U-shaped concave portion that is open at a top thereof when viewed in a cross-section of the vehicle are joined to a bottom surface on both side portions of the floor panel, and beads that have a U-shaped concave portion when viewed in a cross-section of the vehicle are provided at a rear portion of the floor panel, and the beads are aligned with the concave portion of the stiffeners and are provided continuously with the stiffeners.

(2) In the vehicle body floor structure described above in (1), an inclined portion that is connected to the stiffener may be formed at a front end portion of the beads.

(3) In the vehicle body floor structure described above in (1) or (2), rear end portions of the beads may be joined to a middle cross member that is located rearward of the front cross member.

(4) In the vehicle body floor structure described above in (1) or (2), the stiffener may be constituted with a front portion stiffener and a rear portion stiffener that has less strength than the front portion stiffener, and the outrigger may be set as a support point of a sub-frame that is located under the engine room, and for the front portion stiffener to be joined to the outrigger.

(5) In the vehicle body floor structure described above in (4), the position of a rear end of the front portion stiffener may coincide with the position of a rear end of the outrigger.

Effects of the Invention

According to the vehicle body floor structure described above in (1), the input load when the impact from a collision is applied to the front portion of a vehicle is dispersed in the vehicle lateral direction by the connecting components. Furthermore, because the stiffeners and beads are provided continuously with each other, the input load is dispersed via the front cross member in the vehicle lateral direction, and the load is also dispersed and supported by the stiffeners and the beads in the vehicle fore-and-aft direction in the floor panel on either side of the front cross member. Accordingly, because it is no longer necessary to increase the strength of the center frame extensions, and because an input load is able to be dispersed, it is possible to lighten the weight of the vehicle body and the vehicle cabin space can be enlarged. Moreover, it is also possible to achieve an improvement in the rigidity of the floor of the vehicle body as a consequence of using the stiffeners and the beads, so that a low level of noise can be maintained. In addition, as a result of the rectifying action of the stiffeners and the beads, the flow of travelling wind under the floor panel is not disturbed. Consequently, it is possible to reduce the air-resistance when the vehicle is traveling.

According to the vehicle body floor structure described above in (2), the inclined portion makes it possible for the extent of the join (the contact surface area) between the stiffeners and the beads to be enlarged, so that it is possible for the join strength to be increased.

According to the vehicle body floor structure described above in (3), the input load when a vehicle is in a frontal collision can also be dispersed to the middle cross member.

According to the vehicle body floor structure described above in (4), even in a case in which the input load arising from a collision is applied from the sub-frame to the front of a vehicle, this input load is supported by the front portion stiffeners which have greater strength than the rear portion stiffeners. As a result, it is possible to suppress deformation inside the vehicle cabin.

According to the vehicle body floor structure described above in (5), because of the front portion stiffeners and the outriggers, the movement of the dashboard lower which is connected to the front portion of the floor panel towards the vehicle cabin interior can be reliably blocked.

DESCRIPTION OF EMBODIMENTS

Next, embodiments of this invention will be described based on the drawings.

Figure 1:
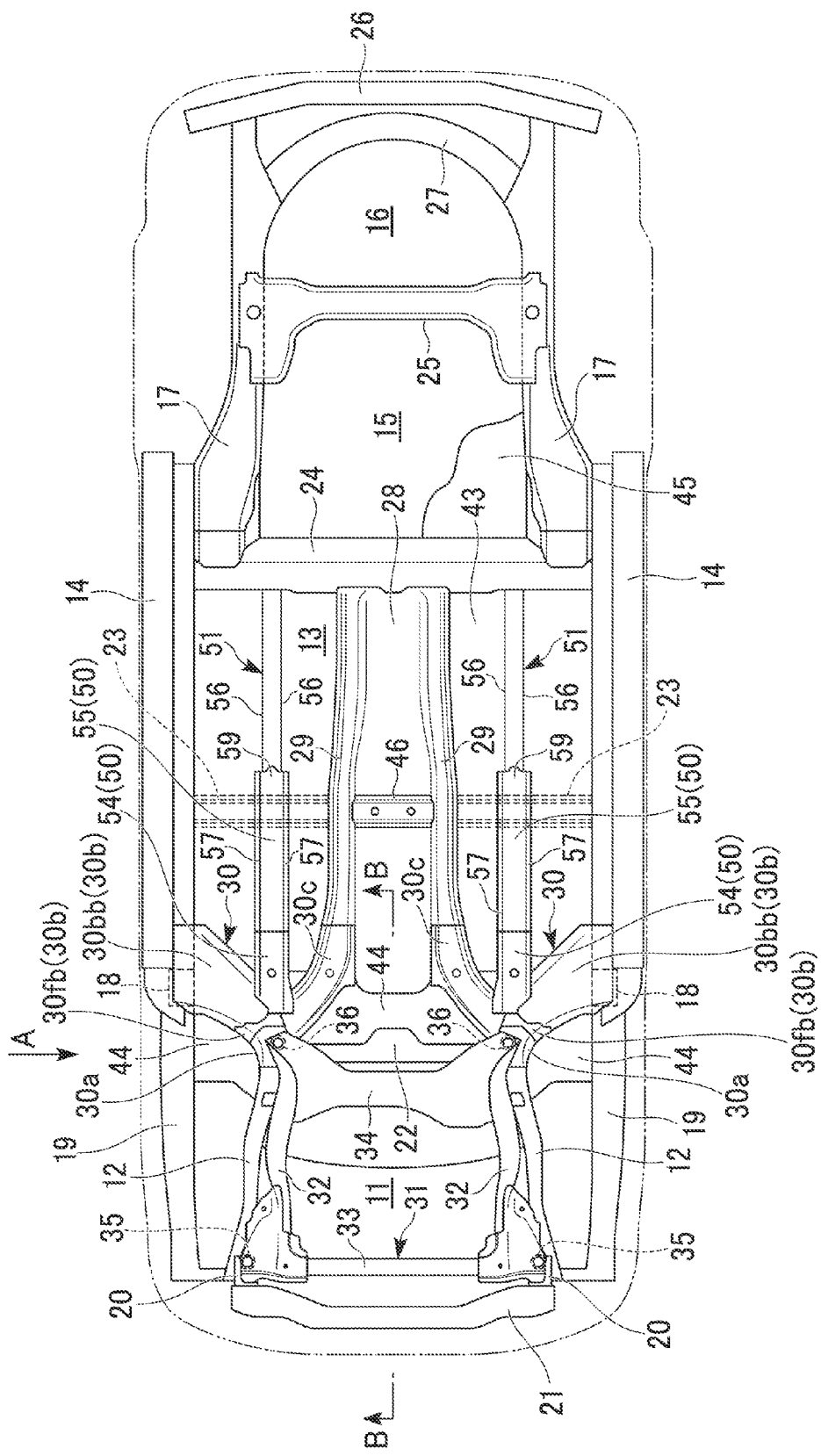
FIG. 1 is a view as seen from below of a vehicle body floor structure of an automobile according to an embodiment of the present invention.
Figure 2:
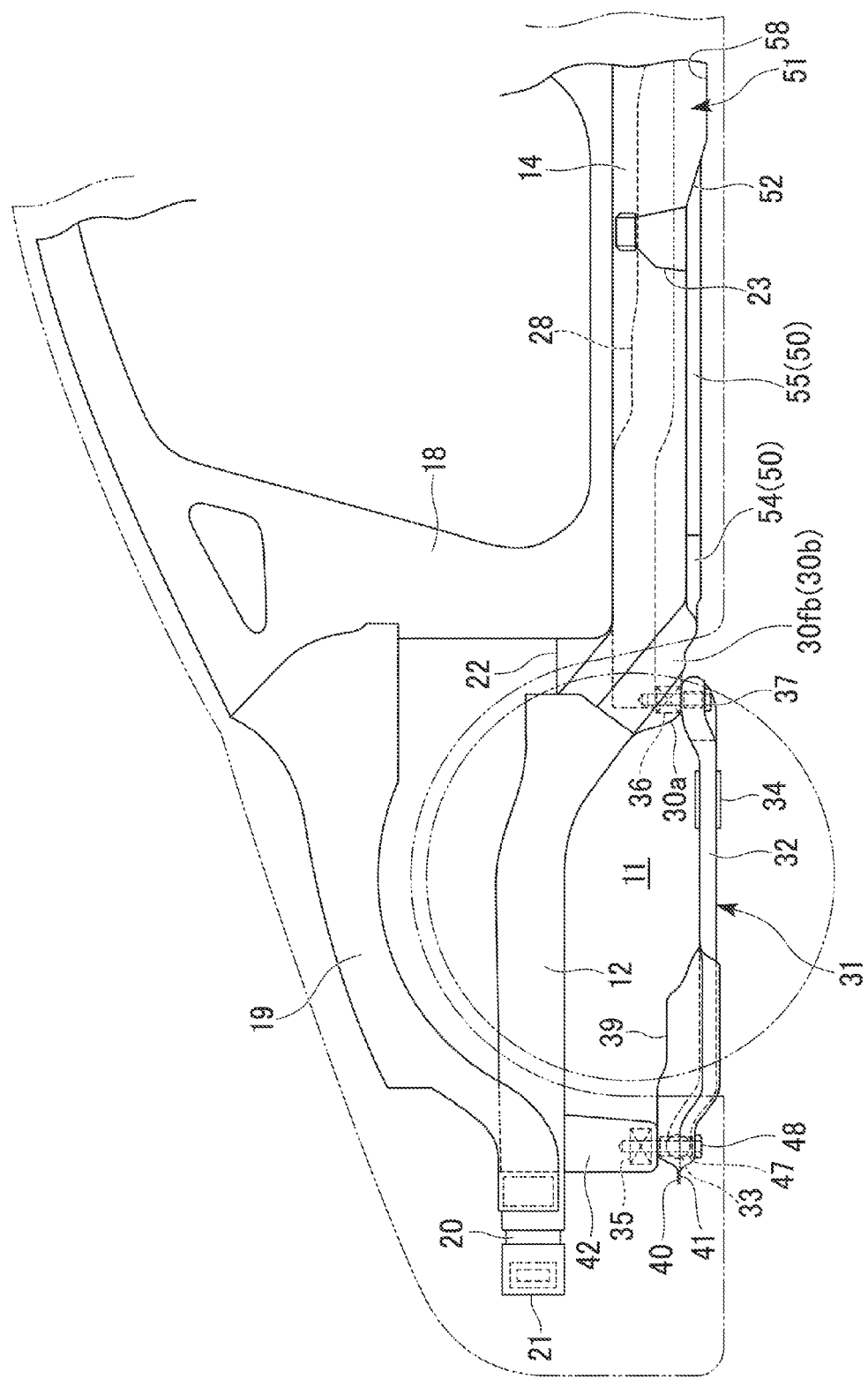
FIG. 2 is a view looking in the direction shown by an arrow A in FIG. 1 of the vehicle body floor structure.

FIG. 1 is a view as seen from below of a vehicle body of an automobile, while FIG. 2 is a view looking at a point shown by an arrow A in FIG. 1. In FIG. 1 and FIG. 2, the external shape of the vehicle is shown as a chain line. As is shown in FIG. 1 and FIG. 2, a vehicle body frame of an automobile (a vehicle body floor structure) is provided with front side frames 12 and 12, side sills 14 and 14, rear side frames 17 and 17, front pillar lowers 18 and 18, and upper members 19 and 19.

The front side frames 12 and 12 extend in the vehicle fore-and-aft direction along both left and right side portions of an engine room 11, and have a left and right pair of closed cross-section structures. The side sills 14 and 14 extend in the vehicle fore-and-aft direction along both left and right side portions of a vehicle cabin 13, and have a left and right pair of closed cross-section structures. The rear side frames 17 and 17 extend in the vehicle fore-and-aft direction along both left and right side portions of a fuel tank housing portion 15 and a trunk room 16, and have a left and right pair of closed cross-section structures. The left and right pair of front pillar lowers 18 and 18 are provided extending upright from front ends of the left and right side sills 14 and 14. The left and right pair of upper members 19 and 19 extend upwards and towards the rear from front ends of the front side frames 12 and 12, and are connected to top ends of the front pillar lowers 18 and 18, and also have a closed cross-section structure.

Moreover, the vehicle body frame is also provided with front side frame extensions 20 and 20, a front bumper beam 21, a dash lower cross member 22, a front cross member 23, a middle cross member 24, a rear cross member 25, a rear bumper beam 26, a rear end frame 27, and center frames 29 and 29.

The front side frame extensions 20 and 20 are provided at a front end of the front side frames 12 and 12.

The front bumper beam 21 extends in the vehicle lateral direction, and the two ends of the front bumper beam 21 are connected to the front end of the front side frames 12 and 12 via the front side frame extensions 20 and 20.

The dash lower cross member 22 extends in the vehicle lateral direction, and connects together rear ends of the left and right front side frames 12 and 12. The dash lower cross member 22 also forms a closed cross-section structure together with a dashboard lower 44 described below. The front cross member 23 extends in the vehicle lateral direction, and connects together center portions in the vehicle fore-and-aft direction of the left and right side sills 14 and 14. The front cross member 23 also forms a closed cross-section structure on a top of front floor panel (a floor panel) 43 described below.

The middle cross member 24 extends in the vehicle lateral direction, and connects together the front ends of the left and right rear side frames 17 and 17. The middle cross member 24 also forms a closed cross-section structure together with a rear floor panel 45 described below. The rear cross member 25 extends in the vehicle lateral direction, and connects together center portions in the vehicle fore-and-aft direction of the left and right rear side frames 17 and 17. The rear cross member 25 also forms a closed cross-section structure together with the rear floor panel 45 described below.

The rear bumper beam 26 extends in the vehicle lateral direction, and connects together the rear ends of the left and right rear side frames 17 and 17. The rear end frame 27 extends in the vehicle lateral direction, and connects together the left and right rear side frames 17 and 17 between the rear cross member 25 and the rear bumper beam 26. A floor tunnel 28 extends from the dash lower cross member 22 to the middle cross member 24.

The left and right pair of center frames 29 and 29 extend respectively along both the left and right sides of the floor tunnel 28, and form closed cross-section structures together with the front floor panel 43 described below.

Furthermore, the vehicle body frame is also provided with a left and right pair of connecting components 30 and 30 that connect together the front side frames 12 and 12, the side sills 14 and 14, and the center frames 29 and 29, and with a structural front sub-frame 31 that is supported on a bottom portion of the left and right front side frames 12 and 12.

Next, the connecting components 30 will be described. Here, because the left and right connecting components 30 and 30 have a mirror-symmetrical shape, only one is described.

As is shown in FIG. 1 and FIG. 2, the connecting component 30 is formed by press-molding a steel plate material into a component having a cross-sectional shape that is open at the top. The connecting component 30 is provided with an outrigger 30b that is joined to the rear end of the front side frame 12, and that extends diagonally outwards as it moves towards the rear, and that is joined to the front end portion of the side sill 14. The structure of the outrigger 30b is divided into a front portion outrigger 30bf that has a cross-sectional shape that is open at the top, and a rear portion outrigger 30bb. The front portion outrigger 30bf and the rear portion outrigger 30bb are joined together. A stiffener 30a that protrudes downwards in a cup shape and is used to mount the front portion outrigger 30fb on the front sub frame is joined to the bottom surface of the front portion outrigger 30fb.

The connecting component 30 is also provided with a center frame extension 30c. The center frame extension 30c is joined to a side wall on the inside of the front portion outrigger 30fb, and extends diagonally inwards in the vehicle lateral direction as it moves towards the rear, and is joined to the front end of the center frame 29. This center frame extension 30c as well is formed having a cross-sectional shape that is open on the top side thereof.

The outrigger 30b and the center frame extension 30c are positioned such that they extend across as far as the join portion between the front floor panel 43 and the dashboard lower 44. By employing this structure, a portion having a closed cross-sectional structure is formed underneath the front floor panel 43 and the dashboard lower 44.

A rubber bush joint 36 is housed inside the front sub-frame mounting stiffener 30a. In addition, a rear portion of the front sub-frame 31 is fixed to the rubber bush joint 36 by being fastened thereto by a bolt 37 that is inserted through the rubber bush joint 36. Accordingly, the front sub-frame mounting stiffener 30a is set as a support point for the rear portion of the front sub-frame 31 that is located under the engine room 11 (see FIG. 2).

Figure 3:
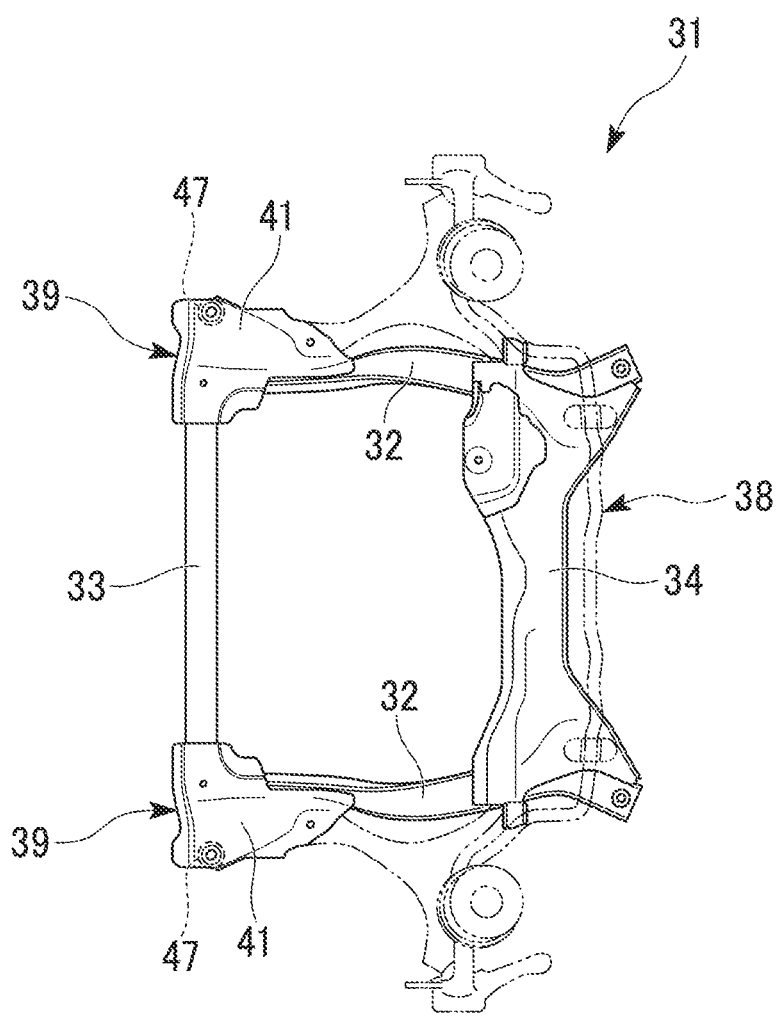
FIG. 3 is a bottom view of a front sub-frame of the vehicle body floor structure.

FIG. 3 is a bottom view of the front sub-frame 31. As is shown in FIG. 3, the front sub-frame 31 is constructed by connecting together in a square frame shape a left and right pair of vertical frames 32 and 32 that are principally molded by hydro forming, a front cross member 33 that is formed from a round pipe material, and a rear cross member 34 that is press-molded. The front cross member 33 is located in a higher position than the vertical frames 32 and 32. A suspension component 38 that is shown by the chain line in the drawing is assembled together with the front sub-frame 31.

Here, reinforcing components 39 are provided at the connecting portions between the vertical frames 32 and 32 and the front cross member 33. These reinforcing components 39 cover a portion of the front portions of the front cross member 33 and also front end portions of the vertical frames 32 as well as outside portions rearwards from these front end portions as far as the vicinity of the center portion in the vehicle fore-and-aft direction of the vertical frames 32 by enveloping these portions from above and below. As is shown in FIG. 2, these reinforcing components 39 are formed by a press-molded top plate 40 and bottom plate 41.

A collar 47 is placed inside the reinforcing component 39 so as to protrude outwards from the front portion thereof, and a bolt 48 is inserted through this collar 47. In addition, the reinforcing component 39 is bolted to the front end of the front side frame 12 via rubber bush joints 35 and 35 which are located inside a front sub-frame mounting bracket 42 that is mounted on a bottom portion of the front end of the front side frame 12. Accordingly, bottom surfaces of the front sub-frame mounting brackets 42 and 42 that are mounted on the bottom surface at the front end of the front side frames 12 and 12 are formed as support points that elastically support the front end of the front sub-frame 31.

As is shown in FIG. 1, the front floor panel 43 is located inside the vehicle cabin 13 between the two side edges of the floor tunnel 28 and the side sills 14 and 14. The center frames 29 are formed at the two side edges of the floor tunnel 28. The center frames 29 first drop downwards below the surface of the front floor panel 43 and then extend vertically upwards, so that the top portion of the center frames 29 are open. Inside edges of the respective front floor panel 43 are joined to the respective sidewalls of the floor tunnel 28 so as to close off the aperture portions in the top of the center frames 29. In addition, inside walls of the side sills 14 are joined to the outside edges of the respective front floor panel 43.

The front side edges of the front floor panel 43 are joined at the top to the rear edge of the bottom portion of the dashboard lower 44. The rear edges of the front floor panel 43 are connected to a rear floor panel 45 that, from the middle cross member 24, forms the floor surface of the fuel tank housing portion 15 and the trunk room 16. In addition, a bulkhead 46 extending in the vehicle lateral direction is joined to the inside of the floor tunnel 28 at a position where it is aligned with the front cross member 23.

Figure 4:
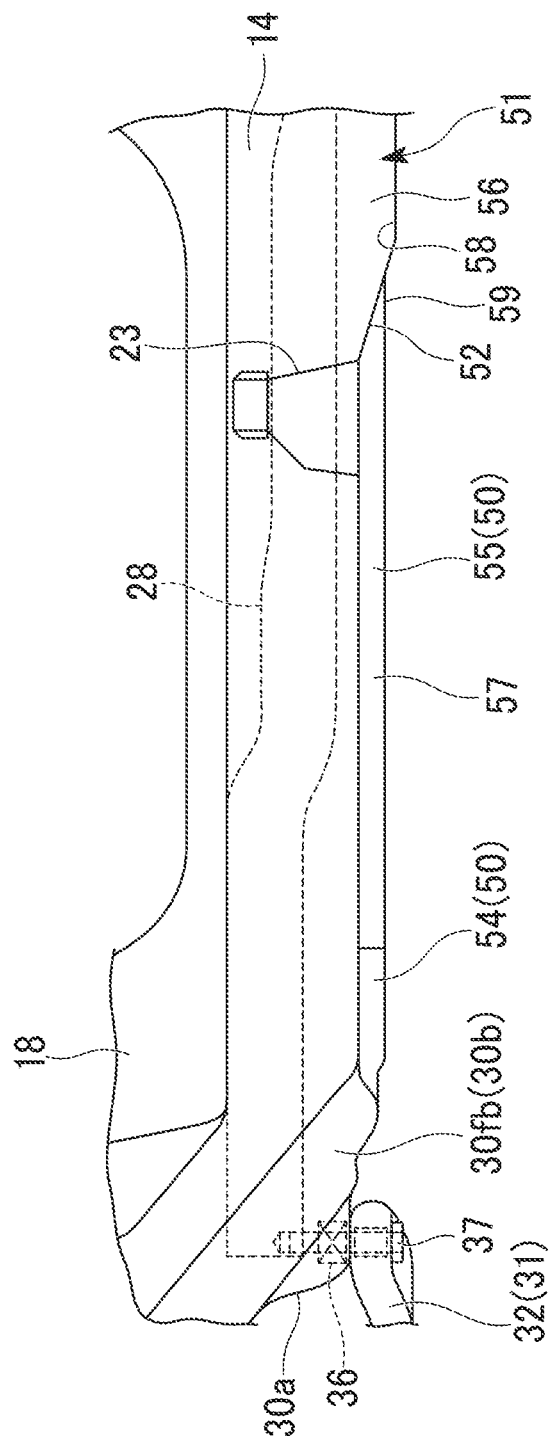
FIG. 4 is an enlarged view of the principal portions shown in FIG. 2 of the vehicle body floor structure.
Figure 5:
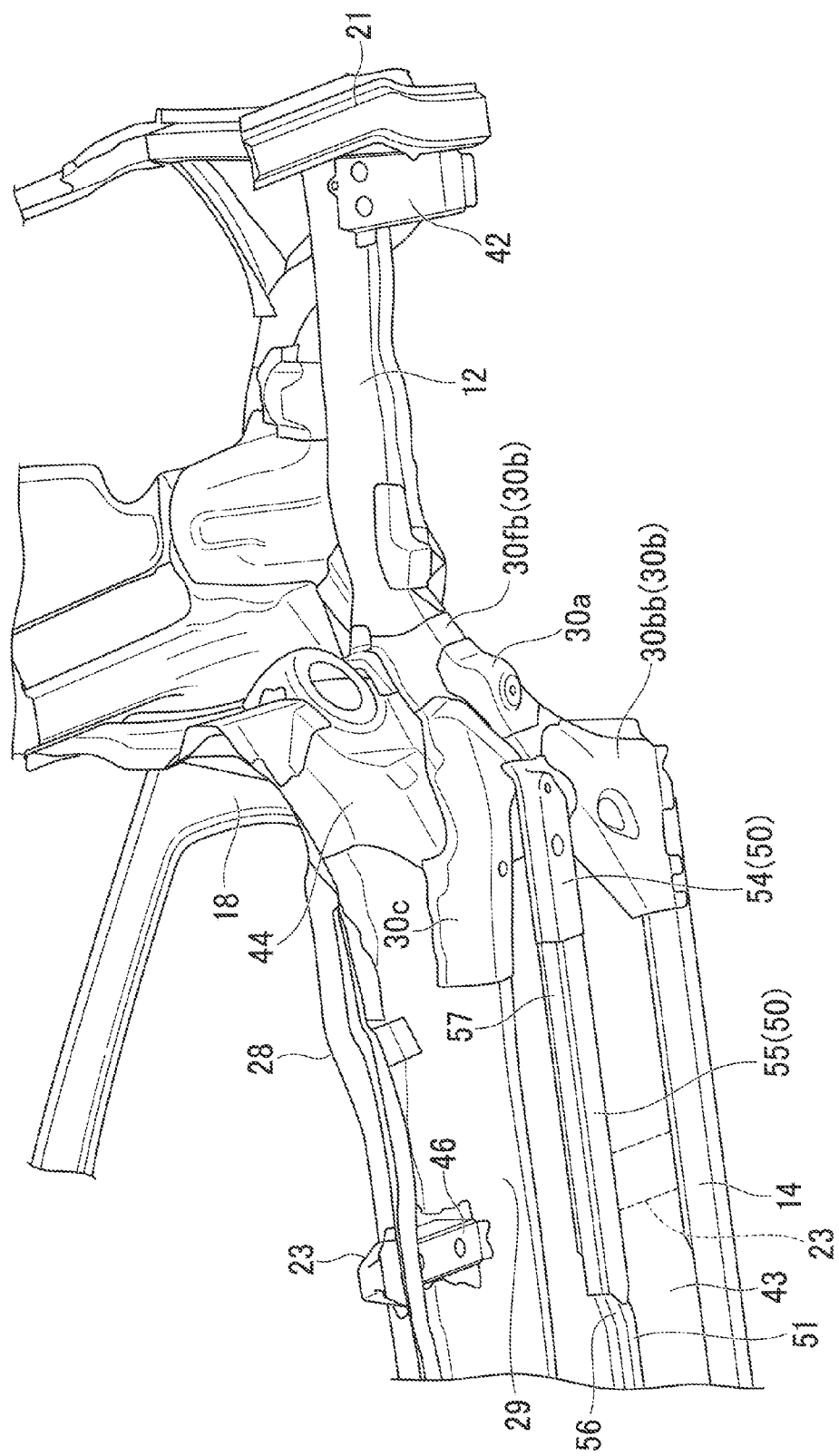
FIG. 5 is a perspective view seen from the underside of a cross-section at a position along a line B-B in FIG. 1 of the vehicle body floor structure.
Figure 6:
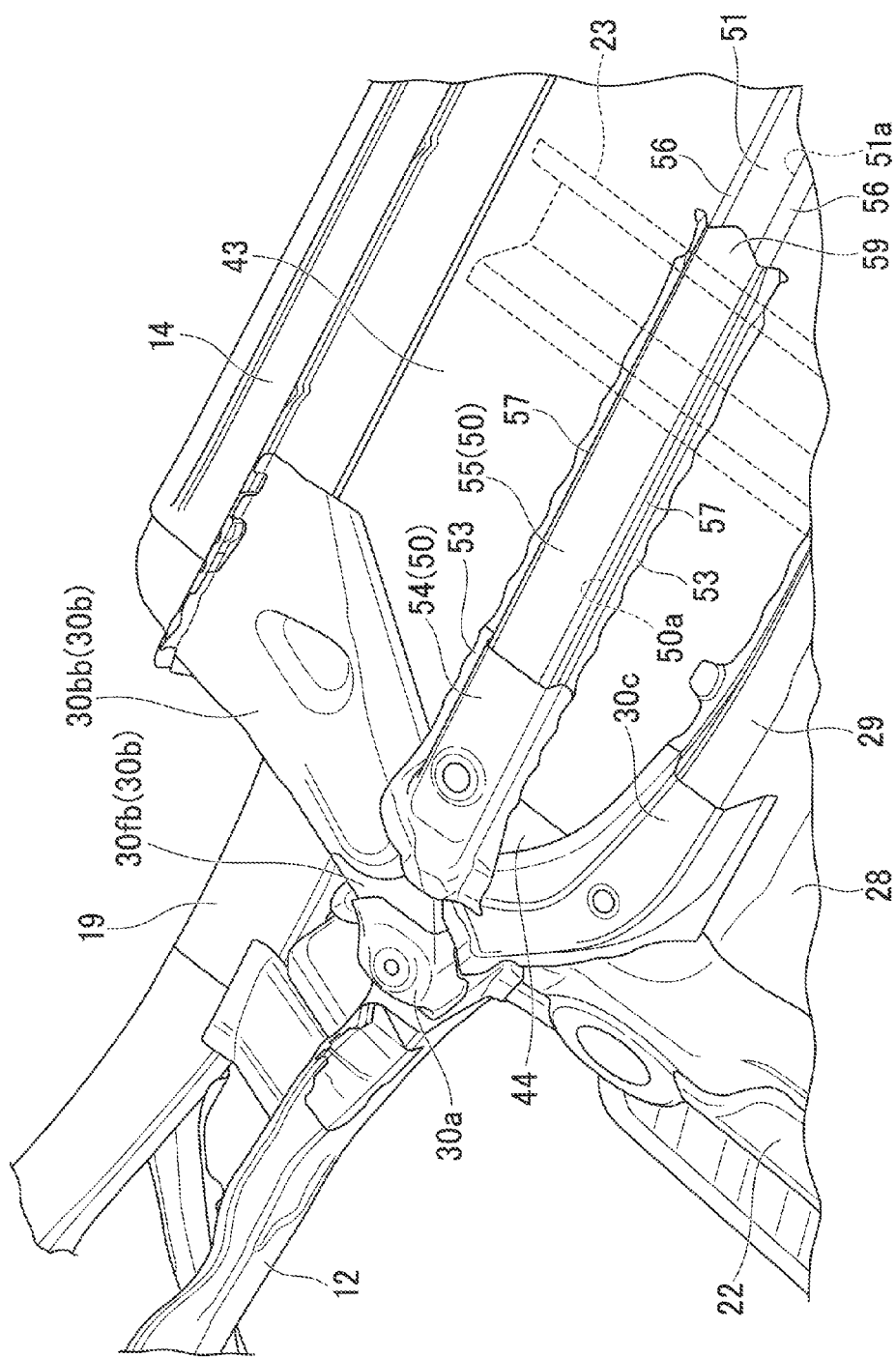
FIG. 6 is a perspective view seen from the rear side of the vicinity of a connecting component of the vehicle body floor structure.

FIG. 4 is an enlarged view showing the principal portions of FIG. 2, FIG. 5 is a perspective view seen from the underside of a cross-section at a position along a line B-B in FIG. 1, and FIG. 6 is a perspective view seen from the rear side of the vicinity of a connecting component.

As is shown in FIG. 4 through FIG. 6, the outrigger 30b, the center frame extension 30c, the dashboard lower 44, and a stiffener 50 extend towards the rear of the vehicle body on the bottom surface of both side portions of the front portion of the front floor panel 43 (only the left side is shown in FIG. 4), more specifically, at the base of the join between the outrigger 30b of the connecting component 30 that is located rearward of the front sub-frame mounting stiffener 30a and the center frame extension 30c, and extend such that they cover this join portion. The stiffener 50 is joined to the front floor panel 43, and has a concave portion 50a which is formed in a U-shape when viewed in cross-section from the front of the vehicle, with the top portion of this U-shape being open. Moreover, the stiffener 50 is joined to a flange portion 53 that is provided at a peripheral edge thereof, and forms a closed cross-sectional structure underneath the dashboard lower 44 the front floor panel 43.

This stiffener 50 extends rearwards beyond the location of the front cross member 23. A bead 51 is provided at a rear portion of the front floor panel 43. The bead 51 has a cross-sectional shape that matches the cross-sectional shape of the stiffener 50. Specifically, the bead 51 has a concave portion 51a which is formed in a U-shape when viewed in cross-section from the front of the vehicle. By employing this structure, the bead 51 is aligned with the same orientation as the concave portion 50a of the stiffener 50. Moreover, the bead 51 is provided so as to be connected to the stiffener 50, and a rear end portion of the bead 51 is joined to the middle cross member 24 that is located at the rear of the front cross member 23.

Here, the stiffener 50 is formed by a strong front portion stiffener 54, and a weak rear portion stiffener 55. The position of the rear end of the front portion stiffener 54 coincides with position of the rear end of the outrigger 30b, namely, the rear portion outrigger 30bb, and the bead 51 is provided so as to be connected to on from the rear end of the rear portion stiffener 55.

An inclined portion 52 that is connected to the rear end portion of the stiffener 50 and that drops downwards from the front to the rear is formed at the front end portion of the bead 51. Specifically, as is shown in FIG. 4, the inclined portion 52 of the bead 51 is a portion in which the front portion of a bottom wall 58 is inclined. In addition, a rear edge 59 of the stiffener 50 (the rear portion stiffener 55) is joined to the bottom wall 58, and a side wall 56 of the bead 51 that corresponds to the inclined portion 52 is joined to a side wall 57 of the stiffener 50 (the rear portion stiffener 55).

Figure 7:
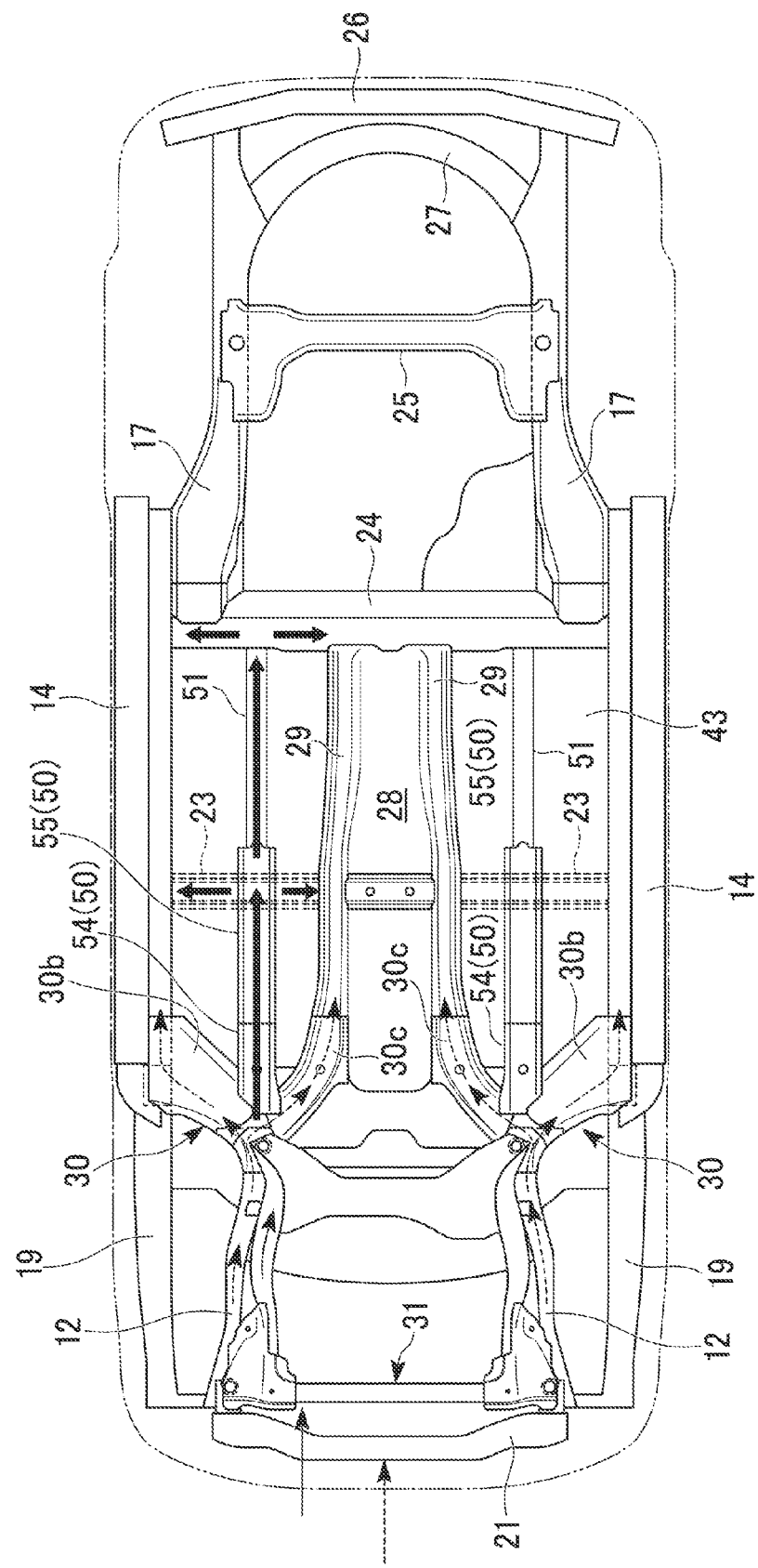
FIG. 7 is a view showing the state of a load transfer in FIG. 1 for the vehicle body floor structure.

According to the above described embodiment, when the vehicle is in a frontal collision, as is shown by the broken line in FIG. 7, the input load that is applied to the front portion of the vehicle from the front bumper beam 21 via the front side frames 12 is dispersed by the connecting components 30 between the side sills 14 and 14 that are located on the two side portions in the vehicle lateral direction, and the center frames 29 and 29 that are located in the center portion in the vehicle lateral direction. In this manner, an input load is transferred to the side sills 14 and 14 and the center frames 29 and 29 by the connecting components 30, and is dispersed in the vehicle lateral direction.

Moreover, in an offset collision in which, for example, only the front-left side of the vehicle is in a collision, if the input load is applied towards the rear from the front sub-frame 31 as well, then a considerable force is applied to the connecting components 30. However, as is shown by the solid line in FIG. 7, this load is transferred in sequence to the connecting component 30 (principally to the outrigger 30b), the stiffener 50, and the bead 51, and is dispersed in the vehicle lateral direction via the front cross member 23. Furthermore, the load is also dispersed by the stiffeners 50 and the beads 51 on either side of the front cross member 23 in the vehicle fore-and-aft direction in the front floor panel 43. In addition, the load is also dispersed in the middle cross member 24, and is dispersed in the vehicle lateral direction.

Accordingly, it is no longer necessary to increase the size of the cross-sectional shape of the connecting components 30, and in particular, of the outriggers 30b, or to increase the thickness of the plate material, and it is possible to lighten the weight of a vehicle. In the same way, because it is no longer necessary to increase the size of the cross-sectional shape of the center frame extensions 30c, the vehicle cabin space can be enlarged.

Moreover, it is also possible to achieve an improvement in the rigidity of the floor including the front floor panel 43 as a consequence of using the stiffeners 50 and the beads 51, so that superb noise control can be maintained. In addition, as a result of the rectifying action of the stiffeners 50 and the beads 51 that are provided continuously with each other in the vehicle fore-and-aft direction, the flow of travelling wind under the front floor panel 43 is not disturbed. Consequently, it is possible to reduce the air-resistance when the vehicle is traveling, and to thereby maintain a low level of noise.

Here, because the inclined portion 52 that is connected to the rear end portion of the stiffener 50 and that drops downwards from the front to the rear is formed at the front end portion of the bead 51, the extent of the join between the stiffener 50 and the bead 51, specifically, the surface area of the join between the side walls 57 of the stiffener 51 and the side walls 56 of the bead 51 (the contact surface area) can be maintained as a large surface area. This makes it possible for the join strength to be increased.

Figure 8:
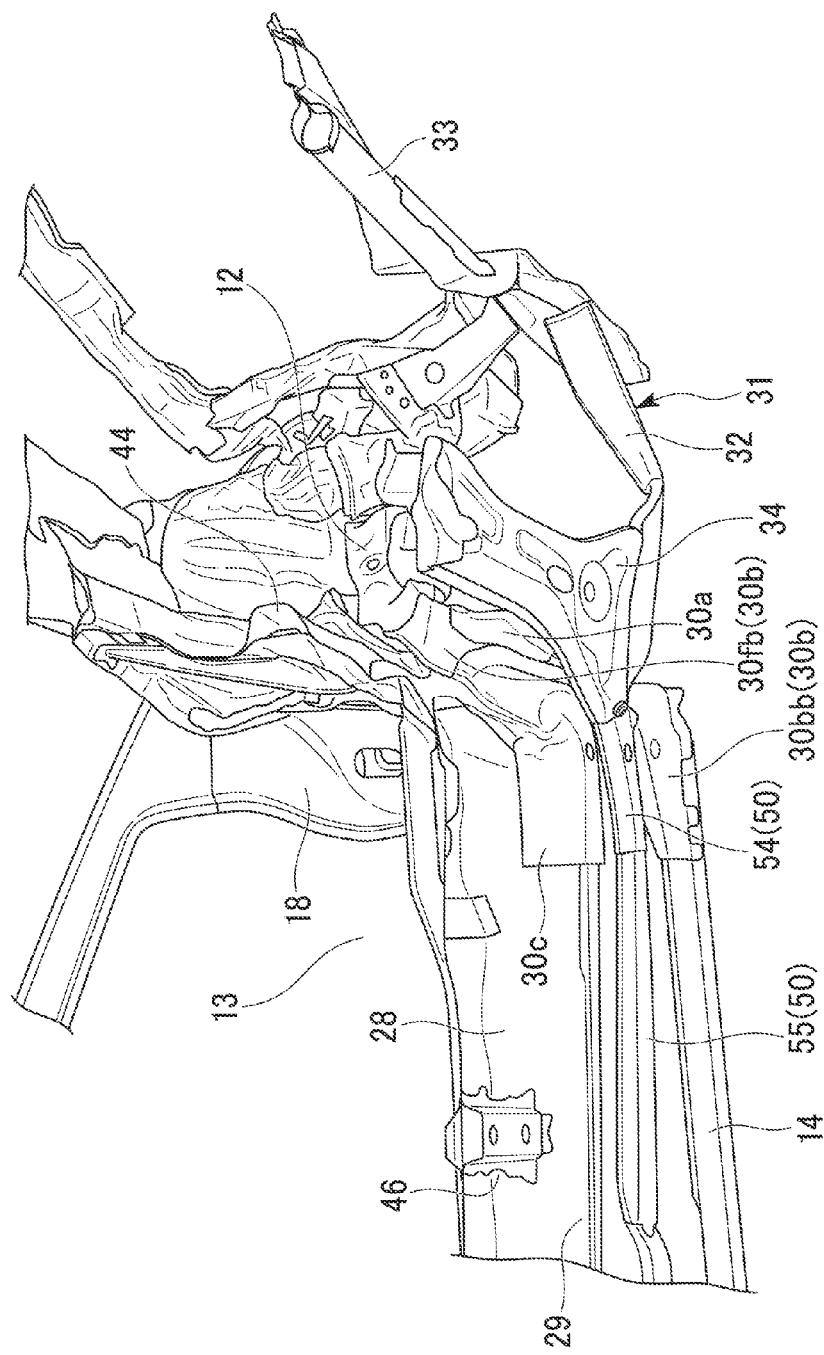
FIG. 8 is a view showing a state of deformation after a left-side offset collision in the vehicle body floor structure, and is a perspective view corresponding to FIG. 5.

Moreover, the stiffeners 50 are formed by the rear portion stiffener 55 and the front portion stiffener 54 which is stronger than the rear portion stiffener 55, and the position of the rear end of the front portion stiffener 54 is made to coincide with the position of the rear end of the outrigger 30b, namely, the rear portion outrigger 30bb. As a result, as is shown in FIG. 8, in an offset collision in which, for example, only the front-left side of the vehicle is in a collision, the front side frame 12 is bent in a left-right direction. At this time, when the outrigger 30b is bent, it gets lifted up so that the dashboard lower 44 tries to deform towards the interior of the vehicle cabin 13, however, because of the front portion stiffener 54 and the outrigger 30b, the movement of the dashboard lower 44 towards the vehicle cabin 13 can be reliably blocked.

Moreover, at this time, it is also possible to employ a structure in which, after the vertical frame 32 of the front sub-frame 31 has been deformed by being bent downwards, the rear end portion of the vertical frame 32 moves away from the front sub-frame mounting stiffener 30a. By employing this type of structure, the movement of the front sub-frame 31 is also suppressed.

REFERENCE SIGNS LIST

11 . . . Engine room
12 . . . Front side frame
14 . . . Side sill
29 . . . Center frame
30 . . . Connecting component
30b . . . Outrigger
30c . . . Center frame extension
43 . . . Front floor panel (floor panel)
23 . . . Front cross member
50 . . . Stiffener
51 . . . Bead
52 . . . Inclined portion
24 . . . Middle cross member
54 . . . Front portion stiffener
55 . . . Rear portion stiffener
31 . . . Front sub-frame
30a . . . Front sub-frame mounting stiffener (support point)

What is claimed is:

1. A vehicle body floor structure comprising:
    front side frames that are placed along a fore-and-aft direction of a vehicle on both side portions of an engine room;
    side sills that are arranged along the fore-and-aft direction on both side portions of a vehicle cabin;
    center frames that are placed along the fore-and-aft direction in a center portion in a vehicle lateral direction of the vehicle cabin; and
    connecting components that connect together rear end portions of the front side frames, front end portions of the side sills, and a front end portion of the center frames, wherein
    the connecting components include:
    outriggers that extend diagonally rearwards toward outside of the vehicle lateral direction and that are connected to the front end portions of the side sills, and center frame extensions that extend diagonally rearwards toward inside of the vehicle lateral direction and that are connected to the front end portion of the center frames, and a floor panel is placed extending over the side sills and the center frames, and a front cross member that extends in the lateral direction is provided on a top surface of the floor panel, and stiffeners that extend as far as a rear of the front cross member and that have a U-shaped concave portion that is open at a top thereof when viewed in a cross-section of the vehicle are joined to a bottom surface on both side portions of the floor panel, and beads that have a U-shaped concave portion when viewed in a cross-section of the vehicle are provided at a rear portion of the floor panel, the U-shaped concave portion of the beads matches the U-shaped concave portion of the stiffeners, and the U-shaped concave portion of the beads are aligned with the concave portion of the stiffeners and are provided continuously with the stiffeners, the stiffener is constituted with a front portion stiffener and a rear portion stiffener, said rear portion stiffener having less strength than the front portion stiffener, and the outrigger is set as a support point of a sub-frame that is located under the engine room, and the front portion stiffener is joined to the outrigger.

2. The vehicle body floor structure according to claim 1, wherein rear end portions of the beads are joined to a middle cross member that is located rearward of the front cross member.

3. The vehicle body floor structure according to claim 1, wherein a position of a rear end of the front portion stiffener coincides with a position of a rear end of the outrigger.

* * * * *